No. 862,578. PATENTED AUG. 6, 1907.
K. O. MUEHLBERG.
HOSE COUPLING.
APPLICATION FILED JUNE 6, 1906.

WITNESSES.
J. R. Keller
J. F. Will.

INVENTOR.
Karl O. Muehlberg,
By Kay, Totten & Winter
Attys.

UNITED STATES PATENT OFFICE.

KARL O. MUEHLBERG, OF HOMESTEAD, PENNSYLVANIA, ASSIGNOR TO PITTSBURGH HOSE CONNECTOR COMPANY, OF PITTSBURG, PENNSYLVANIA, A CORPORATION OF PENNSYLVANIA.

HOSE-COUPLING.

No. 862,578.

Specification of Letters Patent.

Patented Aug. 6, 1907.

Application filed June 6, 1906. Serial No. 320,426.

*To all whom it may concern:*

Be it known that I, KARL O. MUEHLBERG, a resident of Homestead, in the county of Allegheny and State of Pennsylvania, have invented a new and useful Improvement in Hose-Couplings; and I do hereby declare the following to be a full, clear, and exact description thereof.

This invention relates to hose connectors and its object is to provide a device of this character which is simple of construction and will tightly and securely clamp the end of the hose, and which is so constructed that a connector of given size is adapted to hose of several different sizes, or to hose having walls of several different thicknesses.

The invention consists, generally stated, in providing removable and interchangeable spacing and clamping rings or members which are of several different sizes internally to fit hose of several different external sizes and all of which rings are of the same external size so as to fit into the one connector.

Figure 1:
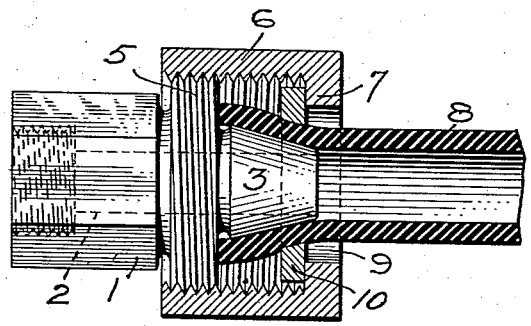
Figure 2:
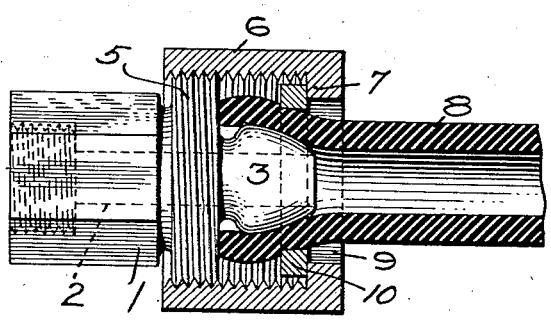

In the accompanying drawings Figure 1 is a longitudinal section through one form of my hose connector, showing the hose clamped in place; Fig. 2 is a similar view showing a hose having a thicker wall, and also showing a slightly different form of nipple.

My hose connector comprises a suitable body 1 provided with the bore or opening 2, as is usual, and at one end provided with a nipple 3 which is tapering or conical, either on a straight taper, as shown in Fig. 1, or on a rounded taper, as shown in Fig. 2. The body has its largest portion threaded externally, as at 5 and working on this threaded portion is the internal threaded sleeve or nut 6 which at its outer end is provided with an inwardly projecting shoulder, such as the flange 7, said sleeve being arranged outside of the hose 8, and the end of the latter fitting over the nipple 3. The opening 9 in the outer end of the sleeve 6 is considerably larger than the hose, and the latter is clamped by means of the removable and interchangeable spacing and clamping ring 10, which externally is of sufficient diameter to be retained in the sleeve 6 by the shoulder 7, and which internally is of a size to fit snugly over the hose 8 and clamp the same firmly on the nipple 3. Preferably the inner face of this clamping ring is beveled, as shown, to correspond approximately with the bevel of the nipple 3, although this is not absolutely necessary as the same may be square, as shown in Fig. 2.

In practice several clamping rings 10 will be provided for each size of hose connector; these clamping rings for a given connector all being of the same size externally but having openings therethrough of different sizes. The bodies of the connectors shown in Figs. 1 and 2 are of the same size and the rings 10 therein are also of the same external size, but have openings of different sizes so as to clamp hose having walls of materially different thicknesses, as shown in the two figures. By using a suitable number, say three or four, interchangeable clamping rings for each size of connector the latter is adapted to quite a variety of sizes or thicknesses of walls of hose, as will be readily apparent.

What I claim is:

A hose connector comprising a tubular body provided with external threads and having on the end a tapering or conical projection designed to enter the hose, an internally threaded sleeve adapted to encircle the hose and engaging the thread of the body and having at its outer end an internal shoulder, and a removable and interchangeable spacing and clamping ring in said sleeve arranged to be engaged by the internal shoulder thereof, the opening through said ring being smaller than the opening in the outer end of the sleeve but larger than the tapering projection on the body and adapted to receive the hose between the same and said body projection.

In testimony whereof, I the said KARL O. MUEHLBERG have hereunto set my hand.

KARL O. MUEHLBERG.

Witnesses:
JNO. A. BLEICHNER,
W. H. SIMMONS.